United States Patent

[11] 3,625,916

| [72] | Inventor | George V. Newman |
|---|---|---|
| | | West Orange, N.J. |
| [21] | Appl. No. | 742,126 |
| [22] | Filed | July 3, 1968 |
| [45] | Patented | Dec. 7, 1971 |
| [73] | Assignee | Ortho International Services Inc. |
| | | Wilmington, Del. |

[54] SYNTHETIC PLASTIC DENTAL ADHESIVE
10 Claims, No Drawings
[52] U.S. Cl. ............ 260/41 A, 260/41 R, 260/DIG. 36
[51] Int. Cl. ............ A61k 5/00, C08f 29/36, C08f 45/04
[50] Field of Search ............ 260/41 R, 41 A, DIG. 36; 106/35

[56]  References Cited
UNITED STATES PATENTS
2,558,139  6/1951  Knock et al. ............ 260/DIG. 36
3,265,202  8/1966  Cornell ............ 260/41

OTHER REFERENCES

Skinner, " The Science of Dental Materials," Fourth Edition, W. B. Saunders Co., 1954, pages 101– 104, 130, 150 and 151.

*Primary Examiner*—Allan Lieberman
*Attorney*—Popper, Bain & Bobis

ABSTRACT: A dental adhesive for securing orthodontic appliances to the tooth which is limitedly resilient and nonfriable, which permits removal of the appliance by steady pressure without dangerous impact and which attenuates dental decay at and about the interface between the appliance and the tooth; the adhesive comprising synthetic plastics in both a liquid and solid phase which polymerize upon mixing of the phases to from a relatively rapidly setting adhesive.

SYNTHETIC PLASTIC DENTAL ADHESIVE

BACKGROUND OF THE INVENTION

At present, most orthodontic appliances are secured to the tooth by means of mechanical friction, the appliance most usually comprising a metallic band surrounding the tooth sufficiently tightly to insure against accidental disengagement. Although a dental cement is most commonly employed between the appliance and the tooth, the cement functions principally to effect a seal therebetween against trapping decay-encouraging debris. Nevertheless, known dental cements are extremely friable and tend to crack and break in use thereby not only permitting decay encouraging debris to penetrate between the band and the tooth but actually trapping such debris exacerbating decay. Thus, it is not uncommon to find a tooth very badly decayed beneath the orthodontic band after its removal. This constitutes a principal disadvantage of existing orthodontic appliances and their manner of application.

Therefore, it is advantageous to employ an orthodontic appliance which engages but one face of the tooth without a surrounding band. However, known dental cements are so brittle and so lacking in adhesion, they cannot function to adhere orthodontic appliances to the tooth which do not in themselves provide substantial frictional engagement.

Moreover, although the dental cement is lacking in adhesion and is extremely brittle, existing orthodontic bands must be removed by a special tool which imparts impact to the band. Such impact removal is dangerous particularly to a heavily decayed tooth resulting frequently in permanent damage to the tooth including breaking off at or adjacent to the gum. Moreover, not only does decay weaken the tooth structurally but there appears to be a progressive decalcification and consequential embrittlement of the tooth beneath the commonly known orthodontic band. Therefore, it is extremely desirable to secure an orthodontic appliance to a tooth by means of an adhesive which may be removed by steady pressure as distinguished from sharp impact.

Thus, it is among the objects and advantages of the present invention to provide a dental adhesive for securing orthodontic appliances to teeth which is limitedly resilient, nonfriable and which may be removed by the application of steady pressure as distinguished from sharp impact.

Another object of the present invention is to provide a dental adhesive as aforesaid which includes ingredients that attenuate dental decay when engaged to the tooth at the interface between the tooth and the orthodontic appliance.

Yet another object of the present invention is to provide a dental adhesive as aforesaid which is sufficiently resilient to absorb the frequent minor impacts to which such dental appliances are frequently subject during use without disengaging the appliance from the tooth or producing small fractures which will admit and trap decay-encouraging debris against the tooth.

Still a further object of the present invention is to provide a dental adhesive as aforesaid having a coefficient of thermal expansion substantially equal to the coefficient of thermal expansion of the enamel of the tooth to which it is applied thereby substantially reducing the danger of delamination between the adhesive and the tooth.

These objects and advantages as well as other objects and advantages may be achieved by the dental adhesive described and claimed herein comprising generally polymerizing synthetics in both a solid and liquid phase which when mixed, harden to the adhesive having the characteristics set forth above.

SUMMARY OF THE INVENTION

A dental adhesive consisting essentially of a solid phase comprising, by weight, essentially, approximately 60 to 70 percent polyethylmethacrylate; approximately 25 to 35 percent of a shrinkage attenuating and thermal expansion equalizing agent selected from the group consisting of calcium carbonate, anhydrous silica, and anhydrous aluminum silicate; and approximately 0.5 to 1 percent of a polymerizing catalyst; a liquid phase comprising, by weight, essentially of approximately 90 to 95 percent methyl methacrylate; approximately 1 to 2 percent trimethylolpropane trimethylacrylate; approximately 1 to 2 percent ethyl methacrylate and a suitable quantity of any nontoxic polymerizing accelerator to adjust the time of setting; the said liquid phase and solid phase appearing in proportions by weight of approximately 5 parts liquid to 13 parts solid to 7 parts liquid and 11 parts solid.

In addition, a filler selected from the group consisting of silica gel and pulverulent, fused glass quartz in amounts of approximately 2 to 10 percent weight may be added to the solid phase provided, however, that the silica gel appears only in the presence of calcium carbonate in quantities of approximately 2 percent by weight silica gel to approximately 23 to 33 percent by weight calcium carbonate. Moreover, a whitening agent, such as titanium dioxide, may be added to the solid phase in quantities of approximately up to 4 percent by weight of the solid phase. In addition, an ultraviolet-radiation absorber may be added to the solid phase in quantities of approximately 5/10 of 1 percent to 1 percent by weight of the solid phase. Still further, a dental caries attenuator selected from the group consisting of sodium fluoride and stannous fluoride may be added to the solid phase in quantities of approximately 1 to 4 percent by weight of the solid phase.

PREFERRED EMBODIMENT OF INVENTION

The invention described herein comprises a solid phase including polymerizable synthetics which interacts with a liquid phase including polymerizable synthetics to form a pastelike dental adhesive which sets at a controlled rate to produce an adhesive having the characteristics claimed.

The solid phase includes the following ingredients:

1. Polyethylmethacrylate.

Polyethylmethacrylate is a polymerizing synthetic which when mixed with cross-linking agents in the liquid phase to be described hereafter together with suitable accelerators produces an adhesive which is limitedly flexible; sets in a controlled period of time and exhibits minimal shrinkage characteristics. It is extremely important to drastically limit the shrinkage of any adhesive which is to be employed on a tooth since shrinkage causes delamination at the interface between the adhesive and the tooth and the adhesive and the dental appliance resulting in total disengagement of the appliance from the tooth. In addition, the adhesive must not be so brittle as known dental cement but rather must be limitedly flexible to absorb blows and the like. Polyethylmethacrylate should be employed in quantities of approximately 60 to 70 percent by weight of the solid phase.

2. An agent to reduce both shrinkage and the coefficient of thermal expansion thereby producing an adhesive having a coefficient of thermal expansion more nearly equal to the coefficient of thermal expansion of tooth enamel selected from the group consisting of calcium carbonate, anhydrous silica, and anhydrous aluminum silicate. The selected agent appears in amounts of approximately 25 to 35 percent by weight of the solid phase.

3. Optionally, a filler selected from the group consisting of silica gel and pulverulent, fused glass quartz, commonly known in the art as "Minusil," in amounts of approximately 2 to 10 percent of the solid phase. While the use of such fillers is optional, they frequently provide superior characteristics to the final adhesive. However, in the event that silica gel is chosen as the filler, it must be employed only in the presence of calcium carbonate in amounts of approximately 2 percent by weight of the solid phase of silica gel to 23 to 33 percent by weight of the solid phase calcium carbonate.

4. A suitable whitening agent may also be employed for cosmetic effects. A whitening agent such as titanium dioxide or its equivalents, which are well known in the dental arts, is preferable. If titanium dioxide is chosen as a whitening agent, it should appear in quantities of up to approximately 2 percent by weight of the solid phase. The total quantity of whitening agent employed is a matter of choice depending upon particular conditions and color match desired.

5. An ultraviolet-light absorber for attenuation of discoloration. Ultraviolet-light absorbers such as 2 hydroxy-4-methoxybenzophenone, known commercially as "Cyasorb," may be conveniently employed in amounts up to approximately 1 percent by weight of the solid phase depending upon the degree of ultraviolet light absorption desired. While the ultraviolet-light absorber is cosmetically desirable, it has no effect on the functional characteristics of the adhesive and hence, functionally, its use is optional.

6. A dental caries attenuator selected from the group consisting of sodium fluoride and stannous fluoride in quantities of approximately 1.0 to 4 percent by weight of the solid phase. Functionally, with respect to the adhesive characteristics of the composition, the dental caries attenuator is not necessary. However, the use of the dental caries attenuator is functionally valuable to prevent or drastically attenuate the deterioration of the tooth beneath the appliance by hardening the tooth to attack by mouth acids.

7. A polymerizing catalyst to aid polymerization and cross-linking of the synthetics in both the liquid and solid phases. Such catalysts are well known in the art and may be employed in such quantities as are necessary to achieve the desired degree of polymerization. Catalysts such as benzoyl peroxide, acetyl peroxide, lauroyl peroxide and t-butyl-hydro peroxide have been found acceptable. Of course, any such catalyst must not be toxic in the manner employed. It has been found that such catalysts employed in quantities of approximately 0.5 to 1 percent by weight of the solid phase result in the desired degree of polymerization and cross-linking.

The liquid phase includes the following ingredients:

1. Methylmethacrylate in an amount of approximately 90 to 95 percent by weight of the liquid phase. Methylmethacrylate is a synthetic which increases substantially the tensile strength of the adhesive bond.

2. Trimethylolpropane trimethacrylate in an amount of approximately 1 to 2 percent by weight of the liquid phase. Trimethylolpropane trimethacrylate is a synthetic which substantially increases the hardness and toughness of the final adhesive bond and is believed to be a cross-linking agent. In addition, it increases the resistance of the final adhesive to acid attack frequently encountered in the oral cavity.

3. Ethylmetharylate in an amount of approximately 1 to 2 percent by weight of the liquid phase. Ethylmethacrylate functions as a cushioning agent increasing both resistance and flexibility of the final adhesive to prevent brittle fracture or chipping.

4. Optionally, methacrylic acid in amounts of approximately 0.5 to 1 percent by weight of the liquid phase may be employed. While methacrylic acid is not absolutely essential to the functional characteristics of the adhesive, it nevertheless, enhances adhesion and reduces discoloration on setting. Thus, while its use is optional, it is desirable to produce a superior product.

5. A suitable polymerization accelerator in quantities sufficient to adjust the setting time of the adhesive. A common accelerator, well known in the art is N-N-dimethyl-p-toluidine which may be conveniently employed in amounts of approximately 0.5 to 1 percent by weight of the liquid phase. Such quantities of this accelerator produce setting times within the desired range.

In use, the solid and liquid phases are mixed together in suitable quantities to form a paste. The relative quantities of the solid and liquid may vary within a wide range from 13 parts solid to 5 parts liquid to 11 parts solid to 7 parts liquid with a proportion of approximately 2 parts solid to 1 part liquid being preferable.

The adhesive is applied to either or both of the tooth and the dental appliance and the dental appliance engaged to the tooth with moderate pressure. The adhesive sets within a relatively short period of time to secure the appliance to the tooth.

When a dental caries attenuator such as stannous fluoride or sodium fluoride or a combination of the two is employed, the likelihood of dental decay beneath the dental appliance or adjacent thereto is greatly reduced. Agents such as sodium fluoride and stannous fluoride reduce the solubility of tooth enamel in acids commonly produced by foods and the like in the oral cavity. In addition, these agents tend to prevent decalcification of the tooth beneath the dental appliance which is commonly experienced when presently known dental cements are employed.

Although, dental caries attenuators of the character described are well known, they are generally applied to the tooth by simply wiping a solution thereof onto the tooth. Under normal conditions, the fluorides are washed free of the tooth by foods, saliva, beverage and the like within approximately 3 hours. The effectiveness of the attenuator, however, is substantially increased if it remains in contact with the tooth without dilution or other interference for extended periods of time substantially greater than the few hours permitted under present conditions.

When the attenuator is mixed in the adhesive, the adhesive functions as an effective carrier to hold the dental caries attenuator against the tooth for a period of time substantially equal to that during which the dental appliance is engaged to the tooth. The particular adhesive employed does not adversely effect the chemical structure of the dental caries attenuator, chemically bond to it or otherwise decrease its efficiency. Thus, a relatively small quantity of dental caries attenuator in the adhesive between the appliance and the tooth remains in contact with the tooth for periods of 6 to 24 months or longer during which the appliance is engaged to the tooth. As a result, the fluorides harden the tooth enamel and make it resistant to dental decay.

For the purposes of illustration and without limiting the scope of the claims appended hereto, the following examples of the solid and liquid phase have been found effective.

Example 1

Solid Phase

| | |
|---|---|
| Polyethylmethacrylate | 60% |
| Calcium carbonate | 32% |
| Titanium dioxide | 1.5% |
| Silica gel | 2% |
| 2 hydroxy-4 methoxy-benzophenone | 0.5% |
| Stannous fluoride | 1.5% |
| Sodium fluoride | 1.5% |
| Benzoyl peroxide | 1% |

Liquid Phase

| | |
|---|---|
| Methylmethacrylate | 95% |
| Trimethylolpropane trimethycrylate | 2% |
| Ethylmethacrylate | 1% |
| Methacrylic acid | 1% |
| N-N-dimethyl-p-toluidine | 1% |

Example 2

| | |
|---|---|
| Polyethylmethacrylate | 60% |
| Anhydrous aluminum silicate | 33% |
| Titanium dioxide | 2.5% |
| 2-hydroxy-4-methoxy-benzophenone | 0.5% |
| Stannous fluoride | 1.5% |
| Sodium fluoride | 1.5% |
| Benzoyl peroxide | 1% |

Liquid Phase

As set forth in example 1.

In table 1, annexed hereto, 10 different compositions of solid phase are set forth in tabular form. This table is presented merely for purposes of illustrating other examples and the same is not The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

TABLE 1.—ILLUSTRATIVE TABLE OF SOLID PHASE COMPOSITIONS

| Ingredient | A | B | C | D | E | F | G | H | I | J |
|---|---|---|---|---|---|---|---|---|---|---|
| 1. Polyethylmethacrylate | 60 | 60 | 60 | 60 | 60 | 60 | 60 | 60 | 60 | 60 |
| 2. Calcium carbonate | 32 | 35 | 32 | 34 | 28 | | | | 32 | 32 |
| 3. Silica gel | 3 | | | | | | | | 3 | |
| 4. Anhydrous aluminum silicate | | | 2 | 2.1 | 3 | | | | | 2 |
| 5. Titanium dioxide | | | | | | 33.0 | 34.5 | 30.5 | | |
| 6. 2-hydroxy-4-methoxybenzophenone | 0.5 | 0.5 | 0.5 | 0.5 | 4 | 2.5 | 0.5 | 3.5 | 0.5 | 1.5 |
| 7. Stannous fluoride | 0.5 | 0.5 | 0.5 | 1 | 1 | 0.5 | 0.5 | 0.5 | 0.5 | 0.5 |
| 8. Sodium fluoride | 1.5 | 1.5 | 2.5 | | | 1.5 | 2 | 1.5 | 1.5 | 1.5 |
| 9. Benzoyl peroxide | 1.5 | 1.5 | 1.5 | 1.4 | 3 | 1.5 | 2 | 1.5 | 1.5 | 1.5 |
| 10. Fused quartz | 1 | 1 | 1 | 1 | 1 | 1 | 0.5 | 1.0 32 | 1 | 1 |

I claim:

1. A dental adhesive prepared by mixing approximately 11 to 13 parts of a solid phase comprising by weight of said solid phase approximately 60 to 70 percent polymethylmethacrylate, approximately 25 to 35 percent of an agent selected from the group consisting of calcium carbonate, anhydrous silica and anhydrous aluminum silicate and approximately 0.5 to 1 percent of a polymerizing catalyst selected from the group consisting of benzoyl peroxide, acetyl peroxide, lauroyl peroxide and t-butyl-hydro-peroxide with approximately 5 to 7 parts of a liquid phase comprising by weight of said liquid phase approximately 90 to 95 percent methyl methacrylate, approximately 1 to 2 percent trimethylolpropane trimethacrylate, approximately 1 to 2 percent ethyl methacrylate, and a suitable polymerizing accelerator in quantities just sufficient to provide a desired setting time.

2. A dental adhesive consisting essentially of,
   a. the composition in accordance with claim 1 and, in the solid phase, by weight of the solid phase,
   b. approximately 1 to 4 percent of a dental caries attenuator selected from the group consisting of stannous fluoride and sodium fluoride.

3. A dental adhesive consisting essentially of,
   a. the composition in accordance with claim 1 and, in the solid phase, by weight of the solid phase,
   b. approximately 2 to 10 percent of a filler selected from the group consisting of silica gel and pulverulent, fused glass quartz, the silica gel appearing only in the presence of calcium carbonate in amounts of approximately 2 percent silica gel to approximately 23 to 33 percent calcium carbonate.

4. A dental adhesive consisting essentially of,
   a. the composition in accordance with claim 3 and, in the solid phase, by weight of the solid phase,
   b. approximately 1 to 4 percent of a dental caries attenuator selected from the group consisting of stannous fluoride and sodium fluoride.

5. A dental adhesive consisting essentially of,
   a. the composition in accordance with claim 1 and, in the liquid phase, by weight of the liquid phase,
   b. approximately 0.5 to 1 percent methacrylic acid.

6. A dental adhesive consisting essentially of,
   a. the composition in accordance with claim 2, and, in the liquid phase, by weight of the liquid phase,
   b. approximately 0.5 to 1 percent methacrylic acid.

7. A dental adhesive consisting essentially of,
   a. the composition in accordance with claim 4 and, in the liquid phase, by weight of the liquid phase,
   b. approximately 0.5 to 1 percent methacrylic acid.

8. A dental adhesive consisting essentially of,
   a. the composition in accordance with claim 1 in which,
   b. the said polymerizing accelerator is N-N-dimethyl-p-toluidine.

9. A dental adhesive consisting essentially of,
   a. the composition in accordance with claim 1 and, in the solid phase,
   b. a suitable whitening agent in quantities sufficient to attain a desired color, and,
   c. a suitable ultraviolet-light absorber in quantities sufficient to maintain a desired color.

10. A dental adhesive consisting essentially of,
   a. the composition in accordance with claim 7 in which,
   b. the said polymerizing accelerator is N-N-dimethyl-p-toluidine.

* * * * *